(12) United States Patent
Chang et al.

(10) Patent No.: US 10,073,911 B2
(45) Date of Patent: Sep. 11, 2018

(54) DEEP LINKS FOR NATIVE APPLICATIONS

(71) Applicant: Google LLC, Mountain View, CA (US)

(72) Inventors: Lawrence Chang, Foster City, CA (US); Hui Xu, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 422 days.

(21) Appl. No.: 14/750,082

(22) Filed: Jun. 25, 2015

(65) Prior Publication Data

US 2015/0379128 A1    Dec. 31, 2015

Related U.S. Application Data (60) Provisional application No. 62/017,193, filed on Jun. 25, 2014.

(51) Int. Cl.
*G06F 17/30* (2006.01)
(52) U.S. Cl.
CPC .... *G06F 17/30864* (2013.01); *G06F 17/3089* (2013.01); *G06F 17/30887* (2013.01)
(58) Field of Classification Search
CPC ................................................ G06F 17/30864
See application file for complete search history.

(56) References Cited

U.S. PATENT DOCUMENTS

| | | | |
|---|---|---|---|
| 7,617,225 B2 | 11/2009 | Arrouye | |
| 8,086,957 B2 | 12/2011 | Bauchot | |
| 8,219,572 B2 | 7/2012 | Ghosh et al. | |
| 8,458,384 B2 | 6/2013 | Johnson | |
| 8,510,764 B1 | 8/2013 | Deselaers | |
| 8,515,979 B2 | 8/2013 | Mehta | |
| 8,554,345 B2 | 10/2013 | Fernandez | |
| 8,595,450 B2 | 11/2013 | Nguyen | |
| 2004/0030882 A1 | 2/2004 | Forman | |
| 2006/0230011 A1* | 10/2006 | Tuttle | G06F 17/30864 706/62 |
| 2007/0209080 A1 | 9/2007 | Ture | |
| 2008/0313190 A1 | 12/2008 | Cheng et al. | |
| 2010/0024016 A1* | 1/2010 | Violleau | G06F 21/335 726/7 |
| 2010/0257466 A1 | 10/2010 | Wroblewski | |
| 2010/0306191 A1 | 12/2010 | LeBeau | |
| 2011/0252038 A1 | 10/2011 | Schmidt | |

(Continued)

FOREIGN PATENT DOCUMENTS

| | | |
|---|---|---|
| EP | 2474905 | 7/2012 |
| EP | 2495670 | 9/2012 |

(Continued)

OTHER PUBLICATIONS

"Adding deep linking to Google+ posts shared from your iOS app," [online][Retrieved on Jan. 7, 2014]; Retrieved from the Internet URL: https://developers.google.com/+/mobile/ios/share/deep-link; 3 pages.

(Continued)

*Primary Examiner* — Charles E Lu
(74) *Attorney, Agent, or Firm* — Fish & Richardson P.C.

(57) ABSTRACT

Methods, systems, and apparatus, including computer programs encoded on a computer storage medium, for automatically generating native application deep links and indexing content retrieved from the deep links.

14 Claims, 4 Drawing Sheets

(56) References Cited

U.S. PATENT DOCUMENTS

| | | |
|---|---|---|
| 2011/0314004 A1 | 12/2011 | Mehta |
| 2012/0124061 A1 | 5/2012 | Macbeth et al. |
| 2012/0179706 A1 | 7/2012 | Hobbs |
| 2012/0179955 A1 | 7/2012 | French |
| 2012/0290584 A1 | 11/2012 | De |
| 2012/0316955 A1 | 12/2012 | Panguluri et al. |
| 2012/0323898 A1 | 12/2012 | Kumar |
| 2013/0006897 A1 | 1/2013 | Jain |
| 2013/0110815 A1 | 5/2013 | Tankovich |
| 2013/0111328 A1 | 5/2013 | Khanna |
| 2013/0122861 A1 | 5/2013 | Kim |
| 2013/0124606 A1 | 5/2013 | Carpenter |
| 2013/0191360 A1 | 7/2013 | Burkard |
| 2013/0232256 A1 | 9/2013 | Lee |
| 2013/0298007 A1 | 11/2013 | Cullen |
| 2013/0311301 A1* | 11/2013 | Grant ............... G06Q 30/0273 705/14.69 |
| 2013/0325856 A1 | 12/2013 | Soto |
| 2014/0040226 A1 | 2/2014 | Sadhukha et al. |
| 2014/0358887 A1* | 12/2014 | Morris ............... G06F 17/3053 707/709 |

FOREIGN PATENT DOCUMENTS

| | | |
|---|---|---|
| JP | 2004-38889 | 2/2004 |
| JP | 2008-537809 | 9/2008 |
| JP | 2010-218064 | 9/2010 |
| JP | 2012-500433 | 1/2012 |
| RU | 110847 | 11/2011 |
| WO | WO2010020963 | 2/2010 |

OTHER PUBLICATIONS

"App Linking," [online][Retrieved on Jan. 7, 2014]; Retrieved from the Internet URL: https://developers.facebook.com/docs/android/link-to-your-native-app/; 14 pages.

"Class Gecko View Content," [online] [Retrieved on Jan. 2, 2014]; Retrieved from the Internet URL: people.mozilla.org/~mfinkle/geckoview/docs/org/Mozilla/gecko/GeckoViewContent.html; 4 pages.

"Deeplink.me Lets Mobile Users Navigate Through a "Web" of Apps," [online] [Retrieved on Dec. 13, 2013]; Retrieved from the Internet URL: techcrunch.com/2013/05/22/new-service-called-deeplink-me-will-let-mobile-users-navigate-through-a-web-of-apps/; 8 pages.

"Frequently Asked Questions—General Information," [online] [Retrieved on Jan. 7, 2014]; Retrieved from the Internet URL: https://linksmanager.com/Frequently+Asked+Questions+-+General+Information; 8 pages.

"Google's Search Results Can Deep-Link to Your Android Apps," [online][Retrieved on Dec. 13, 2013]; Retrieved from the Internet URL: techcrunch.com/2013/10/31/android-4-4-kitkat-app-indexing/; 6 pages.

"How to determine when an application is fully launched?" [online][Retrieved on Jan. 2, 2014]; Retrieved from the Internet URL: social.msdn.microsoft.com/Forums/en-US/27e7353-eb4b-4e23-bf56-84f3efbbecba/how-to-determine-when-an-application-is-fully-launched; 5 pages.

"How to get a deep link of my application from the Windows Phone Marketplace using .NET code?" [online][Retrieved on Dec. 13, 2013]; Retrieved from stackoverflow.com/questions/13639564/how-to-get-a-deep-link-of-my-application-from-the-windows-phone-marketplace-usin; 2 pages.

"Indexing apps just like websites," [online][Retrieved on Dec. 13, 2013]; Retrieved from the Internet URL: googlewebmastercentral.blogspot.com/2013/10/indexing-apps-just-like-websites.html; 4 pages.

"Instant Pages on Google Chrome," [online][Retrieved on Dec. 16, 2013]; Retrieved from the Internet URL: chrome.blogspot.jp/2011/08/instant-pages-on-google-chrome.html; 3 pages.

"Mobile deep linking," [online][Retrieved on Dec. 13, 2013]; Retrieved from the Internet URL: en.wikipedia.org/wiki/Mobile_deep_linking; 2 pages.

"NSApplication Class Reference," [online][Retrieved on Jan. 2, 2014]; Retrieved from the Internet URL: https://developer.apple.com/library/mac/documentation/cocoa/reference/applicationkit/classes/NSApplication_Class/Reference/Reference.html; 66 pages.

"Ready for a "Web" of Apps? Quixey Launches AppURL, A New Way to Enable Deep Linking Across Mobile Applications," [online][Retrieved on Dec. 13, 2013]; Retrieved from the Internet URL: techcrunch.com/2013/08/02/ready-for-a-web-of-apps-quixey-launches-appurl-a-new-way-to-enable-deep-linking-across-mobile-applications/; 8 pages.

"Seven Tips for Supercharging Your Links," [online][Retrieved on Jan. 7, 2014]; Retrieved from the Internet URL: goarticles.com/article/Seven-Tips-For-Supercharging-Your-Links/3056299/; 5 pages.

"Sharing to Google+ from your Android app," [online][Retrieved on Jan. 7, 2014]; Retrieved from the Internet URL: https://developers.google.com/+/mobile/android/share/#handling_incoming_deep_links; 2 pages.

International Search Report and Written Opinion in International Application No. PCT/US2015/037639, dated Sep. 25, 2015, 9 pages.

* cited by examiner

DEEP LINKS FOR NATIVE APPLICATIONS

CLAIM OF PRIORITY

This application claims priority under 35 USC § 119(e) to U.S. Patent Application Ser. No. 62/017,193, filed on Jun. 25, 2014, the entire contents of which are hereby incorporated by reference.

BACKGROUND

The Internet provides access to a wide variety of information. For example, digital image files, video and/or audio files, as well as web page resources for particular subjects or particular news articles, are accessible over the Internet. With respect to web page resources, many of these resources are designed to facilitate the performing of particular functions, such as banking, booking hotel reservations, shopping, etc., or to provide structured information, such as on-line encyclopedias, movie databases, etc.

A variety of search engines are available for identifying particular web page resources accessible over the Internet. With the advent of tablet computers and smart phones, native applications that facilitate the performance of the same functions facilitated by the use of web page resources are now being provided in large numbers.

A user's informational need may thus be satisfied by providing search results that identify either one (or both) of a particular web page resource or a native applications that facilitates the performance of the same functions facilitated by web page resource, or presents the same or very similar information as the web page resource.

SUMMARY

The present disclosure relates to native application deep linking, and more specifically to systems and methods for automatically generating native application deep links.

In general, one innovative aspect of the subject matter described in this specification can be embodied in methods that include the actions of receiving publisher affiliation data for native applications that define, for each native application, an affiliated publisher for the native application; for each native application of a set of native applications, determining, based on the publisher affiliation data, whether it is affiliated with a publisher that provides content addressed by URIs determined for the native application; for only the native applications that are determined to be affiliated with a publisher that provides content addressed by URIs determined for the native application: selecting URIs based on the URI pattern for the native application, indexing content accessible by the URI for the native application in an index that is searchable by a search engine. Other embodiments of this aspect include corresponding systems, apparatus, and computer programs, configured to perform the actions of the methods, encoded on computer storage devices.

Another innovative aspect of the subject matter described in this specification can be embodied in methods that include the actions of determining a uniform resource identifier (URI) pattern for a native application; instantiating the native application and selecting a first URI based on the URI pattern to generate an application page in the native application display environment; indexing application page data of the application page in an index that is searchable by a search engine; iteratively processing linked application pages for the native application until a cessation event occurs, the iterative processing comprising for each iteration; determining, from the application page, outbound URIs including in the first application page; selecting one or more of the outbound URIs to generate one or more subsequent application pages in the native application display environment; indexing the application page data for each of the one or more subsequent application pages in the index. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. The generation of the deep links makes it easier for application developers to participate in native application indexing, which in turn helps drive usage and re-engagement of their applications. The system also lowers the barrier for participation.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A system provides native application search results. As used herein, a native application operates independent of a browser application on the user device. A native application is an application specifically designed to run on a particular user device operating system and machine firmware and not within a browser. Native applications thus differ from browsers, browser-based applications and browser-rendered resources. The latter require all, or at least some, elements or instructions downloaded from a web server each time they are instantiated or rendered. Furthermore, browser-based applications and browser-rendered resources can be processed by all web-capable mobile devices within the browser and thus are not operating system specific as are native applications. Furthermore, as used herein, a native application search result is a search result that corresponds to a particular native application and that, when selected, invokes the particular native application.

Examples of native application include applications to create text documents, edit photographs, play music, interface with a remote banking system, and so on. Mobile native applications are designed to operate on mobile devices such as smart phones, tablets, and so on. Web native applications are designed to run within (both visually and functionally) web browser software. At a very high level, native applications, or simply "apps," provide a user with access to content and/or functionality.

Internet search engines provide the ability to search an indexed collection of web pages that exist on the Internet. The typical search engine provides, in response to a query, a list of results relevant to the query, often with hyperlinks allowing a user to quickly navigate to a result of interest. A user may select a linked result and thereby be provided with a web page(s) containing content about a celebrity, product, business, etc. The links may be to a site's "home page" (e.g., a welcome and search page for a site aggregating cooking information such as recipes) or may be a "content page" that a user can access when navigating from a site's home page (e.g., a specific recipe at the cooking information site). Links to content pages, as opposed to home pages, are referred to as "deep links" (and the process for crawling, indexing, and serving these content pages is similarly referred to as "deep linking").

The ability to navigate to a page, as well as the accessibility of content and functionality that that page provides, is dictated in part by the nature of the published page. For example, certain pages may contain dynamic content (e.g., asynchronous java script and XML (AJAX), Adobe Flash, etc.) that are difficult or impossible to crawl and retrieve. Consequently, these pages may not be available in response to a search, a user may not be able to save the page as a bookmark or the like, and page navigation via browser controls (e.g., forward and back in history) may not operate as intended.

Some native applications lack some of the basic properties of websites when it comes to linking First, when a search engine crawls a native application, it cannot simply inspect the existing link to a page and look at the outbound links of the page like it can by looking at the HTML of a webpage. Second, many native applications do not link to one another the way that websites inherently do, so search engines cannot rely on crawling the web to discover app deep links like they can for discovering web links. This makes it challenging for native application search engines in that it is much more difficult to discover links that a native application supports. If a native application search engine cannot discover links, then it cannot index them, retrieve them, and serve them to users.

Furthermore, some native applications have corresponding web pages for the URIs the native applications access, while others do not. Of those that do have corresponding web pages, some native applications maintain duplicate or corresponding content and functionality between the native application and web platforms, while other native applications have small or large degree differences between mobile and web platforms.

Some systems for indexing native applications rely on developers to publish their native application deep links either as HTML markup on their webpages or in their existing sitemaps. That is, the native application provider must have both a web platform and at least map the native application pages at the website. Some services providing native application deep linking also rely on developers publishing their native application deep links on their webpages.

According to the present disclosure, native application deep links may be automatically generated for indexing purposes. There are numerous methods for native application deep link generation, depending on the nature of the native application deep links. For example, some native applications support deep links having URIs that conform to web-based uniform resource locators (URLs), such as http:// www.example.com, etc. Other native applications use a custom URI that does not necessarily conform to a particular HTTP protocol.

For native applications that support deep linking based on web-based URLs, a process to generate native application deep links includes:

1) Native application developers verify their official website with a centralized indexing service. The service then indexes the native application based on the previously indexed web URLs discovered through web crawling.

2) A native application data crawling and indexing system inspects registration information, such as a manifest file, of the native application to determine if it supports the appropriate URL structure of the website.

3) If the native application does support the appropriate URL structure, the native application data crawling and indexing system can determine and prioritize links based on criteria such as popularity. The native application data crawling and indexing system will also respect any non-index tag in the registration information which specifies which URL paths should not be indexed.

According to a second aspect of the present disclosure, for native applications that support custom deep linking, a system implements a method comprising the following steps:

1) Native application developers implement a native application indexing API that allows specifying the URI address of a particular native application document, its corresponding web URL (if any), and all outbound app deep links and their associated web URLs (if any) that are on the document.

2) Once a native application is updated at a digital distribution source, the native application data crawling and indexing system inspects the native application to determine if it is using the native application indexing API. If so, then the native application data crawling and indexing system launches the native application and looks for the link to native applications "home page." The native application data crawling and indexing system also looks for any outbound URI links on the application page. If there are outbound URIs, then the native application data crawling and indexing system will index each of those links (or only affiliated links), and will also in turn process the subsequent native application pages for outbound URIs as well. Thus the native application data crawling and indexing system is able to automatically discover links. And at each step, the native application data crawling and indexing system can check the current link of the application page against the source link as a method of authentication.

3) The native application data crawling and indexing system can be used to maintain a list of those links that are actually being viewed by the user within a native application, and provide that list to the native application data crawling and indexing system. The native application data crawling and indexing system uses this list as an additional source of links, in addition to the automatic discovery described in the previous step. Furthermore, the lists of links that are actually viewed can be used to determine link popularity, and the native application data crawling and indexing system can then prioritize crawling based on the popularity of links.

Accordingly, the systems and methods described herein can provide an automatic indexing of native application deep links. The systems and methods may further determine and utilize link prioritizations from actual user activity. Prioritization permits, inter alia, optimizing the utilization of search resources. Finally, systems and methods are disclosed that can accommodate apps with and without corresponding websites, overcoming the limitations of existing techniques that require apps to publish links through corresponding webpages.

Figure 1:
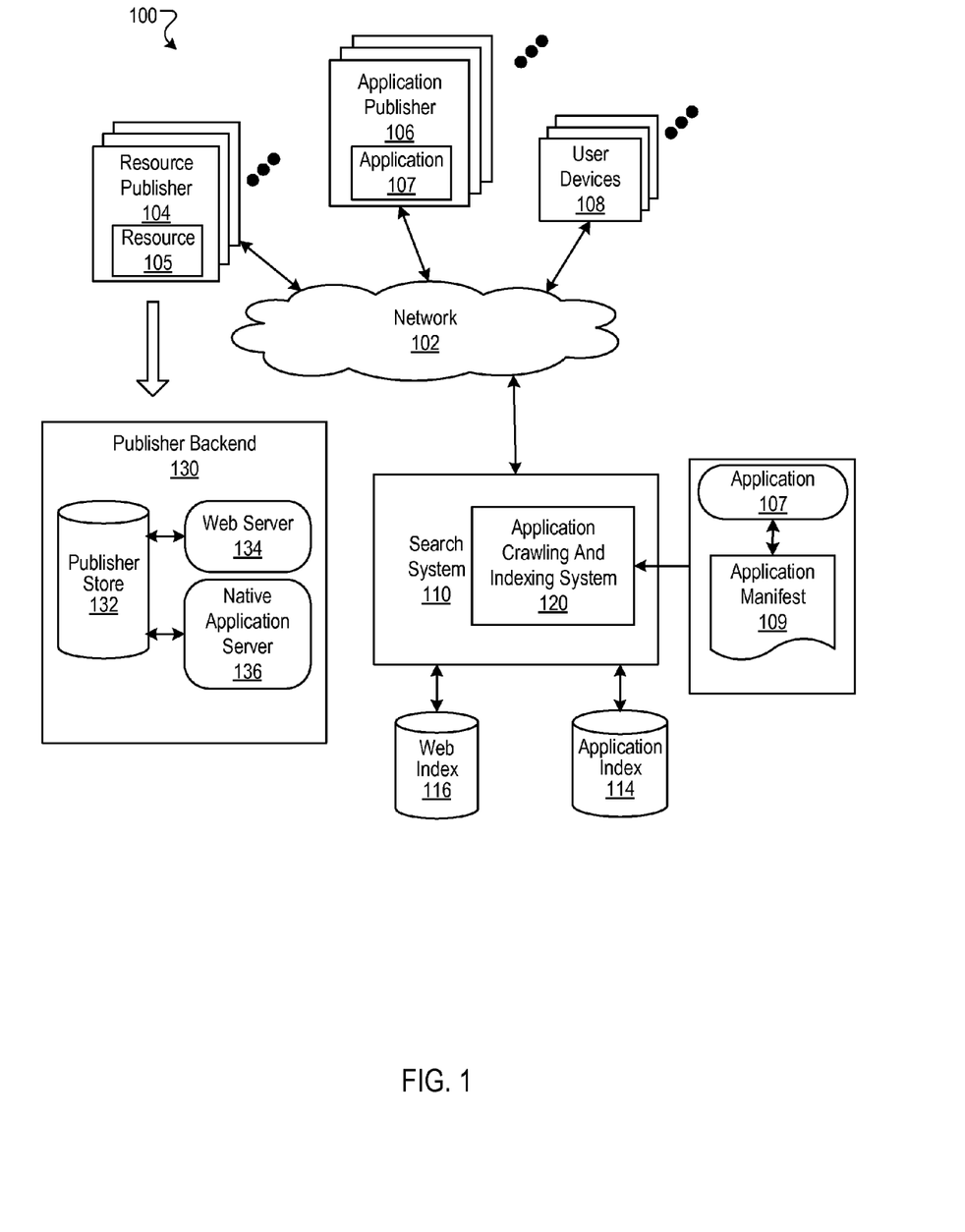
FIG. 1 is a block diagram of an example environment in which deep links for native applications are generated.

FIG. 1 is a block diagram of an example environment 100 in which deep links for native applications are generated. A computer network 102, such as the Internet, connects resource publisher web sites 104, application publishers 106, user devices 108 and a search engine 120.

A resource publisher website 104 includes one or more web resources 105 associated with a domain and hosted by one or more servers in one or more locations. Generally, a resource publisher website is a collection of web pages formatted in hypertext markup language (HTML) that can contain text, images, multimedia content, and programming elements. Each website 104 is maintained by a content publisher, which is an entity that controls, manages and/or owns the website 104.

A web page resource is any data that can be provided by a publisher website 104 over the network 102 and that has a resource address, e.g., a uniform resource locator (URL). Web resources may be HTML pages, images files, video files, audio files, and feed sources, to name just a few. The resources may include embedded information, e.g., meta information and hyperlinks, and/or embedded instructions, e.g., client-side scripts.

An application publisher website 106 may also include one or more web resources 105, and also provides native applications 107. A native application 107 is an application specifically designed to run on a particular user device operating system and machine firmware. Native applications 107 may include multiple versions designed to run on different platforms. For example, native applications corresponding to a movie database website may include a first native application that runs on a first type of smart phone, a second native application that runs on a second type of smart phone, a third native application that runs on a first type of tablet, etc.

An application page is a particular display environment within a native application and in which is displayed content, such as text, images, and the like. An application page is specific to the particular native application, and the native application is specific to the particular operating system of the user device 108. An application page differs from a rendered web resource in that the application page is generated within and specific to the native application, while a web resource may be rendered in any browser for which the web page resource is compatible, and is independent of the operating system of the user device.

Some publishers 104 and 106 may be the same, and provide the same content in both web resources and native applications. The management of the delivery of such content is handled by a publisher backend 130. The publisher backend 130 includes a publisher store 132 that stores content the publisher provides, a web server 134 that provides the content from the publisher store as web resources (e.g., web pages), and a native application server 136 that handles requests from a native application. The web pages correspond to native application pages, and thus for many native application URIs there are corresponding web page URIs. Some native applications may also simply use the same URLs as the web pages to which they correspond. The content of the publisher store 132 is accessible for presentation on both the web resources and the corresponding native application pages. Accordingly, such content is referred to as "synchronized" content.

Examples of such publishers are news publishers, which may have a "mobile news app" for reading news content on a mobile device. The news content (e.g., the text of news story) provided on web resources 105 are the same content that is provided by the corresponding application pages of the native application 107.

A user device 108 is an electronic device that is capable of requesting and receiving web page resources 105 and native applications 107 over the network 102. Example user devices 108 include personal computers, mobile communication devices, and tablet computers.

The web index 116 is an index of publisher content that has, for example, been built from crawling the publisher websites 104, by receiving data feeds from the publisher websites 104, or by other appropriate methods of collecting and indexing data.

The native application index 114 stores data relating to native applications 107. The application index 114 stores, for example, a list of native applications provided by the publishers 104 and identifiers that identify the native applications. Furthermore, in some implementations, publishers 104 may specify that certain native applications 107 are used to access and display synchronized data, and this information may be stored in the application index. For example, a news publisher may specify that a news reading application it provides displays synchronized content that is displayed on the news publisher's website.

The user devices 108 submit search queries to the search engine 110. In response to each query, the search engine 110 accesses the web index 116 and the application index 114 to identify content that is relevant to the query. The search engine 110 may, for example, identify the resources and applications in the form of web resource search results and native application search results, respectively, by of use a search result generator 116. Once generated, the search results are provided to the user device 108 from which the query was received.

A web resource search result is data generated by the search engine 110 that identifies a web resource, based on the content of the resource that satisfies a particular search query. A web resource search result for a resource can include a web page title, a snippet of text extracted from the resource, and a uniform resource identifier (URI) for the resource, e.g., the uniform resource locator (URL) of the web page. When selected at a user device, the web resource search result causes the user device to generate a request for the resource located at the URL. The web resource that is received is then displayed in a browser application.

A native application search result specifies a native application and is generated in response to a search of the application index 114 and the web index 116, as described in more detail below. When selected at a user device, the native application search result causes the native application installed on the user device to request the synchronized content. Once the native application receives the requested content, the native application displays the content in a user interface of the native application.

Figure 2:
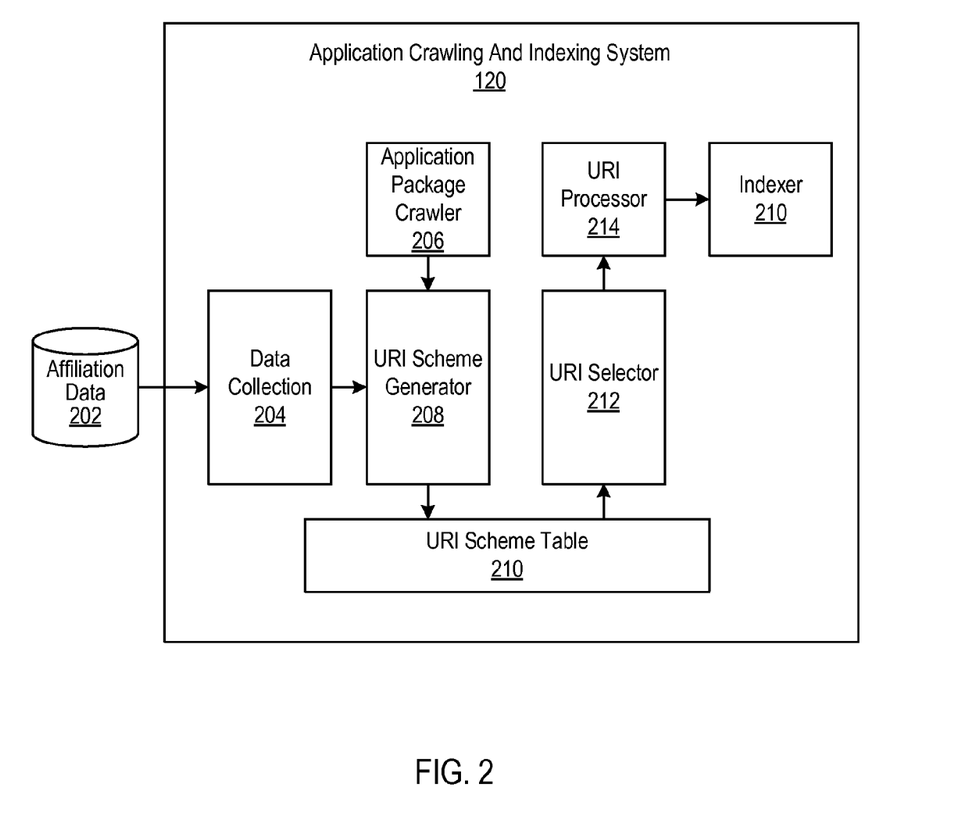
FIG. 2 is a block diagram of an application crawling and indexing system.

To generate the application index 114, the search system utilizes an application crawling and indexing system 120. FIG. 2 is a block diagram of an application crawling and indexing system 120. Operation of the system 120 in the context of native applications that use URLs is described with reference to FIG. 3. A variation of the operation for native applications that use custom URIs is described with reference to FIG. 4.

Figure 3:
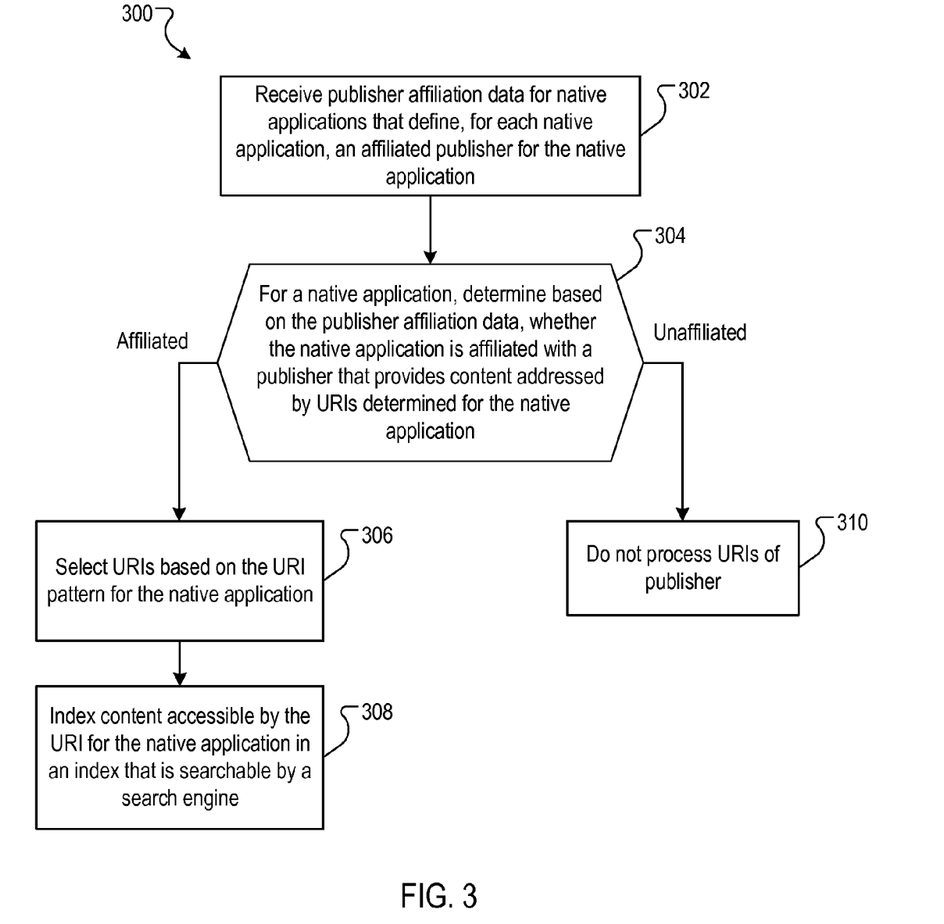
FIG. 3 is a flow diagram of an example process for generating deep links for native applications.

FIG. 3 is a flow diagram of an example process 300 for generating deep links for native applications. The process 300 is implemented in a data processing apparatus of one or more computers.

The process 300 receives at the data collector 204 publisher affiliation data 202 for native applications that define, for each native application, an affiliated publisher for the native application (302). For example, publishers provide data that a particular native application is affiliated with the publisher, such as an association of a native application identifier with a site identifier of the publisher. One example site identifier is a domain name, but other types of data for defining an affiliation between a publisher and native application can be used.

The process 300, for a native application, determines based on the publisher affiliation data whether the native application is affiliated with a publisher that provides content addressed by URIs determined for the native application (304). For example, the application package crawler 206 extracts from an application manifest file 109 (or other data defining similar application specifications) a scheme, host and path of a URI format for the native application. For example, in the case of an Android manifest, the following is extracted from an intent filter section:

<data android:scheme="http"
  android:host="example.com"
  android:pathPrefix="/gizmos"/>

Here the scheme is "http,", the host is "example.com," and the path is "/gizmos." The process determining a URI pattern for the native application, and whether the URI pattern defines an affiliated publisher for the native application that matches an affiliated publisher for the native application specified by the publisher affiliation data 202. To illustrate, for the example data above, if the affiliation data 202 defines a scheme of "http" for a native application, and a host of "example.com," and the manifest 109 of the native application 107 defines the same scheme and host, then the native application is affiliated with the host.

If the determination is positive, the URI scheme generator 208 stores the data for the native application in the URI scheme table 210, and then the process 300 selects URIs based on the URI pattern for the native application (306). For example, in some implementations, the URI selector 212 retrieves the URI pattern from the URI scheme table 210. The selector 212 then searches the web index 116 for URL's that that include the URI pattern. In the example above, candidate URLs that being with http://example.com/gizmos/ will be processed by the selector 212. The selector 212 may discard URLs that may include an indication they are not to be crawled; that have been recently searched and indexed for the native application, that are indicated as being deleted or inactive; or URLs that meet some other exclusion criteria.

The remaining URLs that are selected are provided to a URI processor 214, which the collects data from content accessible by the URL. The process 300 then indexes content accessible by the URL for the native application in an index that is searchable by a search engine (308). The collection and indexing of data can be done by any appropriate process. In one example implementation, system 120 instantiates a virtual machine emulating an operating system for a user device. The virtual machine may, in some implementations, be a modified version of the operating system and includes extractors that extract data from application pages as described in more detail below.

The system 120 also instantiates, within the virtual machine, a native application 107 that generates application pages for display on a user device within the native application 107, and then accesses, within the virtual machine, application pages of the native application generated in response to processing the selected URLs. For each application page, the system 110 generates application page data describing content of the application page. The content of the page may include, for example, text displayed on the application page; images displayed on the application page; links on the application page to other application pages or other web resources; and other content that is appropriate for indexing.

In some implementations, the virtual machine includes extractors that extract content data for indexing. The extracted content data is, for example, data that is provided to a rendering process of the native application. The rendering process renders content based on the data for display on a user device. Use of extractors allows for more accurate identification of the various content of an application page. For example, the text extractor extracts text data provided to a rendering process of the native application. The text data specifies the text that is to be rendered in the application page. Thus, rather than processing an image of the application page, or processing binary data of the display, the virtual machine receives the actual text that is to be rendered in the environment of the native application 107.

Other extractors can likewise be used, such as an image extractor and a list extractor. The image extractor provides image data of an image that is to be rendered in the environment of the native application 107, and the list extractor provides list data of a list of scrollable items that is rendered in the environment of the native application 107. Other data can also be extracted, such as application page link data describing links within the application page that link to another application page; web page link data describing links within the application page that link to a web resource referenced by a uniform resource locator and that, when selected, instantiate a browser application that renders the resource in a browser environment separate from the native application; etc.

The extractors described above, and other appropriate data extractors, can be implemented using appropriate data handlers for a particular operating system. For example, for the Android™ operating system, the extractors may be implemented using TextView objects, ImageView objects, and ListView objects, respectively. The virtual machine processes the objects to extract the corresponding data, e.g., by including instructions that cause the virtual machine to store for indexing the corresponding data that is provided for rendering.

Returning to 304, if the determination is negative, then the process 300 does not process URIs of publisher (310). This facilitates the indexing of publisher content for only the native application that are affiliated with the publisher (e.g., published by the publisher or approved by the publisher to display publisher content).

Figure 4:
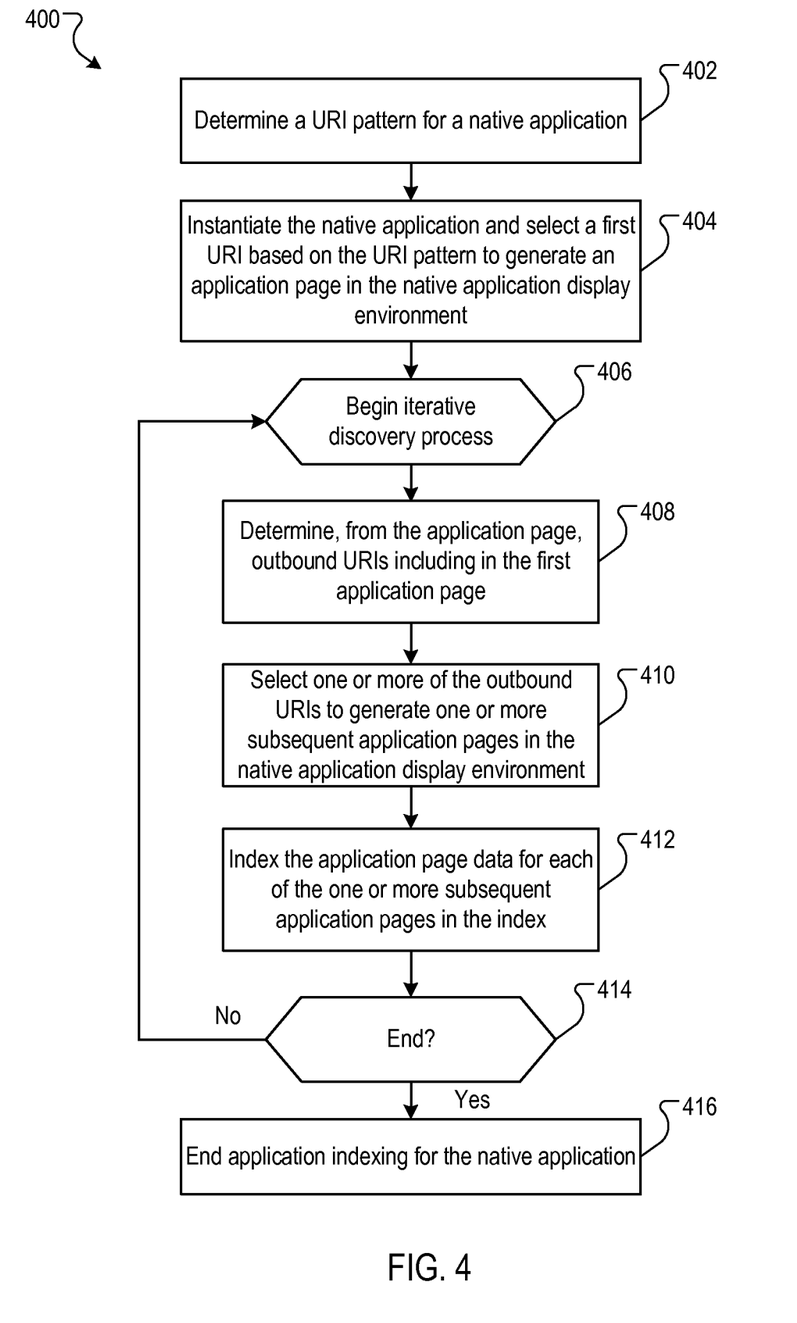
FIG. 4 is a flow diagram of another example process for generating deep links for native applications.

For native applications that support custom deep linking that does not necessarily conform to a website, a different process is used to generate deep links FIG. 4 is a flow diagram of another example process for generating deep links for native applications. The process 400 is implemented in a data processing apparatus of one or more computers.

The process 400 determines a URI pattern for a native application (402). For example, the application manifest 109 may be accessed to determine the URI scheme. The URI scheme may be used to define a "top level" native application URI resource, or may be used to select URIs that have already been indexed for the native application.

The process 400 instantiate the native application and selects a first URI based on the URI pattern to generate an application page in the native application display environment (404). For example, a virtual machine is instantiated, and on the virtual machine the native application is also instantiated. The URI is provided to the native application and the application page is rendered.

The process 400 begins an iterative discovery process (406). The process will continue until a complete set of URIs have been processed.

The process 400 determines, from the application page, outbound URIs including in the first application page (408). For example, a native application API determines from the application page data URIs that link to other native application URIs. The determination can be made, for example, by processing text extracted from the application page for matches to the URI pattern generated from the manifest 109; or based on the API selecting mark-up text that defines outgoing URIs.

The process 400 selects one or more of the outbound URIs to generate one or more subsequent application pages in the native application display environment (410). In some implementations, all outgoing URIs are selected. In other implementations, only the outbound URIs conforming to the URI pattern of the native application are selected.

The process 400 indexes the application page data for each of the one or more subsequent application pages in the index (412). As described above, the system 110 can use a virtual machine, or some other construct, to extract the application page data for indexing.

The process 400 determines if the iterative discovery process has ended (414). If the iterative discovery process has ended, then the process 400 ends application indexing for the native application (416). Otherwise, the process 400 returns to step 406 and begins another iteration.

In some implementations, when actual users view content within the native applications, the native application API can be used to let the application crawling and indexing system 120 know that links that are actually being viewed by users. The application crawling and indexing system 120 can use this information as an additional source of links, in addition to the organic discovery described above. Furthermore, the application crawling and indexing system 120 can also prioritize crawling based on the popularity of links.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method performed by data processing apparatus comprising one or more computers in data communication, the method comprising:
   receiving publisher affiliation data for native applications that define, for each native application, an affiliated publisher for the native application;
   for each native application of a set of native applications, determining, based on the publisher affiliation data, whether the native application is affiliated with a publisher that provides content addressed by URLs for the publisher that are also URIs determined for the native application, the determining comprising:
      determining a URI pattern for the native application;
      determining whether the URI pattern defines an affiliated publisher for the native application that matches an affiliated publisher for the native application specified by the publisher affiliation data, the determining comprising determining whether the URI has a host name that matches a domain of the publisher, wherein a match of a host name of the URI to the domain of the publisher results in a positive determination, and not matching the host name of the URI to the domain of the publisher results in a negative determination; and
      determining that that native application is affiliated with the publisher only when the URI pattern for the native application defines an affiliated publisher for the native application that matches an affiliated publisher for the native application specified by the publisher affiliation data;
   for only the native applications that are determined to be affiliated with a publisher that provides content addressed by URIs determined for the native application;
      selecting URIs that are URLs for a publisher host, the selecting based on the URI pattern determined for the native application, wherein each URL selected is a URL that begins with the URI pattern determined for the native application; and
      indexing content accessible by the URI for the native application in an index that is searchable by a search engine.

2. The computer-implemented method of claim 1, wherein determining the URI pattern for the native application comprises processing a native application manifest file for data describing the URI pattern.

3. The computer-implemented method of claim 1, wherein the publisher affiliation data for each native application defines an affiliation between a domain of a publisher and a native application identifier of a native application.

4. The computer-implemented method of claim 1, wherein selecting URIs based on the URI pattern for the native application comprises selecting, from an index, URIs that include the URI pattern.

5. The computer implemented method of claim 4, wherein the URIs are uniform resource locators (URLs).

6. The computer-implemented method of claim 1, wherein selecting URIs based on the URI pattern for the native application comprises:
instantiating the native application and selecting a first URI based on the URI pattern to generate an application page in the native application display environment;
iterative processing linked application pages for the native application until a cessation event occurs, the iterative processing comprising for each iteration;
determining, from the application page, outbound URIs including in the first application page; and
selecting one or more of the outbound URIs to generate one or more subsequent application pages in the native application display environment.

7. A system, comprising:
a data processing apparatus; and
software stored in non-transitory computer readable storage medium storing instructions executable by the data processing apparatus and that upon such execution cause the data processing apparatus to perform operations comprising:
receiving publisher affiliation data for native applications that define, for each native application, an affiliated publisher for the native application;
for each native application of a set of native applications, determining, based on the publisher affiliation data, whether the native application is affiliated with a publisher that provides content addressed by URLs for the publisher that are also URIs determined for the native application, the determining comprising:
determining a URI pattern for the native application;
determining whether the URI pattern defines an affiliated publisher for the native application that matches an affiliated publisher for the native application specified by the publisher affiliation data, the determining comprising determining whether the URI has a host name that matches a domain of the publisher, wherein a match of a host name of the URI to the domain of the publisher results in a positive determination, and not matching the host name of the URI to the domain of the publisher results in a negative determination; and
determining that that native application is affiliated with the publisher only when the URI pattern for the native application defines an affiliated publisher for the native application that matches an affiliated publisher for the native application specified by the publisher affiliation data;
for only the native applications that are determined to be affiliated with a publisher that provides content addressed by URIs determined for the native application;
selecting URIs that are URLs for a publisher host, the selecting based on the URI pattern determined for the native application, wherein each URL selected is a URL that begins with the URI pattern determined for the native application; and
indexing content accessible by the URI for the native application in an index that is searchable by a search engine.

8. The system of claim 7, wherein determining the URI pattern for the native application comprises processing a native application manifest file for data describing the URI pattern.

9. The system of claim 7, wherein the publisher affiliation data for each native application defines an affiliation between a domain of a publisher and a native application identifier of a native application.

10. The system of claim 9, wherein the determining whether the URI pattern defines an affiliated publisher for the native application comprises determining whether the URI has a host name that matches the domain of the publisher, wherein a match of a host name of the URI to the domain of the publisher results in a positive determination, and not matching the host name of the URI to the domain of the publisher results in a negative determination.

11. The system of claim 7, wherein selecting URIs based on the URI pattern for the native application comprises selecting, from an index, URIs that include the URI pattern.

12. The system of claim 11, wherein the URIs are uniform resource locators (URLs).

13. The system of claim 12, wherein selecting URIs based on the URI pattern for the native application comprises:
instantiating the native application and selecting a first URI based on the URI pattern to generate an application page in the native application display environment;
iterative processing linked application pages for the native application until a cessation event occurs, the iterative processing comprising for each iteration;
determining, from the application page, outbound URIs including in the first application page; and
selecting one or more of the outbound URIs to generate one or more subsequent application pages in the native application display environment.

14. A non-transitory computer readable storage medium storing instructions executable by a data processing apparatus and that upon such execution cause the data processing apparatus to perform operations comprising:
receiving publisher affiliation data for native applications that define, for each native application, an affiliated publisher for the native application;
for each native application of a set of native applications, determining, based on the publisher affiliation data, whether the native application is affiliated with a publisher that provides content addressed by URLs for the publisher that are also URIs determined for the native application, the determining comprising:
determining a URI pattern for the native application;
determining whether the URI pattern defines an affiliated publisher for the native application that matches an affiliated publisher for the native application specified by the publisher affiliation data, the determining comprising determining whether the URI has a host name that matches a domain of the publisher, wherein a match of a host name of the URI to the domain of the publisher results in a positive determination, and not matching the host name of the URI to the domain of the publisher results in a negative determination; and
determining that that native application is affiliated with the publisher only when the URI pattern for the native application defines an affiliated publisher for the native application that matches an affiliated publisher for the native application specified by the publisher affiliation data;

for only the native applications that are determined to be affiliated with a publisher that provides content addressed by URIs determined for the native application;

selecting URIs that are URLs for a publisher host, the selecting based on the URI pattern determined for the native application, wherein each URL selected is a URL that begins with the URI pattern determined for the native application; and indexing content accessible by the URI for the native application in an index that is searchable by a search engine.

* * * * *

UNITED STATES PATENT AND TRADEMARK OFFICE
CERTIFICATE OF CORRECTION

| | | |
|---|---|---|
| PATENT NO. | : 10,073,911 B2 | Page 1 of 1 |
| APPLICATION NO. | : 14/750082 | |
| DATED | : September 11, 2018 | |
| INVENTOR(S) | : Chang et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 468 days.

Signed and Sealed this
Twenty-third Day of April, 2019

Andrei Iancu
*Director of the United States Patent and Trademark Office*